United States Patent Office 3,118,856
Patented Jan. 21, 1964

3,118,856
TERNARY BLENDS OF VINYL CHLORIDE POLYMER-POLYSULFIDE RUBBER-CHLOROSULFONATED ETHYLENE POLYMER AND PROCESSES FOR MAKING THE SAME
Ival O. Salyer and Harry Phillip Holladay, Dayton, Ohio, assignors to Monsanto Chemical Company, St. Louis, Mo., a corporation of Delaware
No Drawing. Filed July 22, 1960, Ser. No. 44,522
10 Claims. (Cl. 260—45.5)

This invention relates to vinyl chloride polymers. In one aspect, this invention relates to vinyl chloride compositions comprising ternary blends of vinyl chloride polymer, polysulfide rubber, and chlorosulfonated ethylene polymer. In another aspect, this invention relates to methods for making ternary blends of vinyl chloride polymer, polysulfide rubber, and chlorosulfonated ethylene polymer.

The many valuable properties of vinyl chloride polymers are well known since this polymer has become one of our most important plastics of commerce. Unfortunately, this polymer has one serious disadvantage, namely, relatively poor impact resistance, which precludes its extensive use in fabricating rigid articles that must withstand blows in normal usage.

It has been found that the impact strength of vinyl chloride polymers can be increased by intimately admixing with the vinyl chloride polymer a polysulfide rubber to form a binary polyblend. However, the polysulfide rubber is too limitedly compatible with the vinyl chloride polymer and, therefore, binary polyblends of these two components possess low tensile strength which precludes the use of these binary polyblends in many applications. For example, a binary polyblend comprising 85 weight percent vinyl chloride polymer and 15 weight percent polysulfide rubber has a tensile strength at break of only 2700 p.s.i. as compared with a similar value of 8000 p.s.i. for vinyl chloride alone.

We have now discovered that the compatibility of a polysulfide ruber in vinyl chloride polymer can be increased by blending into a mixture of vinyl chloride polymer and polysulfide rubber a chlorosulfonated ethylene polymer, which is also limitedly compatible with said vinyl chloride polymer, to form a ternary polyblend composition having improved properties, including improved impact strength and tensile strength.

An object of this invention is to provide improved vinyl chloride polymer compositions.

Another object of this invention is to provide ternary polyblend compositions of vinyl chloride polymer, polysulfide rubber, and chlorosulfonated ethylene polymer.

Another object of this invention is to provide a method for raising the impact strength of vinyl chloride polymer compositions without excessively lowering the tensile strength.

Another object of this invention is to provide a method for raising the impact strength, tensile strength, and percent elongation of binary polyblend compositions of vinyl chloride polymer-polysulfide rubber.

Other aspects, objects and advantages of this invention will be apparent from a consideration of the accompanying disclosure and the appended claims.

In accordance with this invention, improved vinyl chloride polymer compositions are made by incorporating small amounts of both polysulfide rubber and chlorosulfonated ethylene polymer in vinyl chloride polymers to form a ternary blend of the same. The novel ternary polyblends of this invention comprise a major proportion of vinyl chloride polymer and a minor proportion of both polysulfide rubber and chlorosulfonated ethylene polymer. Ordinarily, the ternary blends of this invention comprise 40% to 96% by weight vinyl chloride polymer, 2% to 30% by weight polysulfide rubber, and 2% to 30% by weight chlorosulfonated ethylene polymer. Preferably, the polysulfide rubber and the chlorosulfonated ethylene polymer are present in the ternary blends of this invention in equal amounts; however, either the polysulfide rubber or the chlorosulfonated ethylene polymer can be present in an amount in excess of the other. Although these proportions of addends in the novel vinyl chloride polymer compositions of this invention are preferred, other compositions outside the stated proportions can also be formed with fewer improvements in physical properties and with improvements to a lesser degree than are obtained in the preferred compositions.

The vinyl chloride polymers utilized in this invention are unplasticized polyvinyl chloride and unplasticized interpolymers containing at least 80% by weight vinyl chloride and up to 20% by weight of one or more ethylenically unsaturated compounds such as vinyl acetate, vinylidene chloride, ethyl acrylate, acrylonitrile, dibutyl maleate, and the like. Mixtures of such vinyl chloride polymers can also be used if desired.

The vinyl chloride polymers may be prepared by any of the polymerization techniques known to and employed by those skilled in the art, including such methods as solution, suspension, emulsion, and mass polymerization techniques. The vinyl chloride resins employed in the ternary compositions of this invention most generally have weight average molecular weights in the range of from 30,000 to 500,000, although higher or lower molecular weight vinyl chloride resins are useful to some extent in the present invention. The molecular weights referred to are determined by light scattering in methyl ethyl ketone solution.

The term "vinyl chloride polymer" as used herein is intended to include homopolymers of vinyl chloride, i.e., polymers prepared by subjecting to polymerization a monomeric material consisting of vinyl chloride as the sole polymerizable constituent, and copolymers of vinyl chloride with other ethylenically unsaturated monomers copolymerizable therewith; therefore, it is to be understood that such copolymers can be employed whenever reference is made herein to "polyvinyl chloride resins."

The polysulfide rubbers utilized in the composition of this invention are solid materials which are usually described as being polythiopolymercaptans which may be produced, for example, according to the process described in U.S. Patent 2,466,963. These polysulfide polymers are commercially available and are sold, for example, under the trade name "Thiokol." Preferred polysulfide rubbers for use in this invention are the "Thiokol FA" and the "Thiokol ST" products "Thiokol FA," which is defined as being a condensation polymer formed by reacting ethylene dichloride and dichloroethyl formal with sodium polysulfide, has a specific gravity of 1.34 and is terminated in a hydroxyl group. "Thiokol ST," which is said to be a condensation polymer of dichloroethyl formal containing 2% trichloropropane with sodium polysulfide, has a specific gravity of 1.25 and is terminated in a thiol group. Each of these polysulfide rubbers has a molecular weight above 20,000. Other polysulfide rubbers can also be used in making the ternary blends of this invention and the above polymers are merely given as examples of preferred materials.

The chlorosulfonated ethylene polymers incorporated in the ternary blends of this invention are well known to those skilled in the art. For example, certain commercial products sold under the trade name of "Hypalon" are chlorosulfonated polyethylenes. Chlorosulfonated ethylene polymers are made by chlorination and sulfonation of normally solid high molecular weight polymers of ethylene. Suitable ethylene polymers usually have average molecular weights of at least 6000 and preferably above 15,000. Such ethylene polymers can be made readily by subjecting ethylene containing from 10 to 200 p.p.m. oxygen to polymerization at very high pressures, for example, 20,000 to 40,000 p.s.i. There are other methods for preparing solid polyethylenes, for example, by employing peroxide or azo catalysts and water or an organic liquid reaction medium along with moderately high pressures, for example, 5,000 to 15,000 p.s.i. Also, as is well known in the art, ethylene polymers of greater rigidity and higher density can be prepared at relatively low pressures, e.g., less than 1,000 p.s.i., using organometallic and metal oxide-supported catalysts. If desired, the ethylene polymer which is chloro-sulfonated may be one which gives a copolymer of ethylene and an ethylenically unsaturated comonomer processed in an amount preferably not to exceed 15 weight percent of the ethylene, for example, propylene, butene-1, butadiene, vinyl acetate, vinyl chloride, vinylidene chlorofluoride, and methyl methacrylate.

The chlorosulfonation of the ethylene polymer can be effected in a number of different ways and one very suitable method for producing a preferred type of chlorosulfonated ethylene polymer is described in U.S. Patent 2,586,363. As disclosed therein, polyethylene is chlorosulfonated to form a polymer having a preferred chlorine content of about 25% to 37% by weight and a preferred sulfur content of from 0.4% to 3% by weight. One very suitable chlorosulfonated polyethylene for use in this invention contains about 27.5 weight percent chlorine and about 1.5 weight percent sulfur. The chlorine and sulfur atoms are believed to be chemically combined with the hydrocarbon chain of the polymer with most of the chlorine substituted on the chain and the sulfur combined with the chain as —$SO_2Cl$ groups. This material contains about one chlorine atom per every 6 to 7 carbon atoms and one —$SO_2Cl$ group for every 90 to 130 carbon atoms. In the preparation of the chlorosulfonated polyethylene, the chlorosulfonation can be effected by reacting the polyethylene with chlorine and sulfur dioxide, with $SO_2Cl_2$, or with $SO_2Cl_2$+chlorine. Other procedures for making chlorosulfonated polyethylenes are prescribed in the prior art, for example, in U.S. Patents 2,212,786 and 2,405,971. Preferably, the chlorosulfonated polyethylenes employed in the ternary blends of this invention have a chlorine content of from 10% to 50% by weight and a sulfur content of from 0.2% to 10% by weight. However, chloronated polyethylenes containing 10% to 50% chlorine by weight and essentially no $SO_2Cl$, or sulfur, are also useful.

The ternary polyblend compositions of this invention are prepared by intimately admixing the vinyl chloride polymer, the polysulfide rubber, and the chlorosulfonated ethylene polymer together. These components may be mixed in any order and may be in any conventional form. Preferably, all three components are admixed together in a suitable container to form a rough mix which is then mixed on a conventional mixing machine of the type normally used for mixing rubber or plastics, e.g., a mill roll, a Banbury mixer, or extruder. If desired, the vinyl chloride polymer can first be placed on a mill roll and, after a smooth rolling bank has formed in the nip of the rolls, the other two components of the blend added either separately or as a mixture. Regardless of the method by which the mixing of the ingredients is accomplished, it is necessary that the components be admixed together or worked under sufficient heat and pressure to insure efficient dispersion of the various components in the mixture to form a completely homogeneous material. The tempertaure at which this working or mastication is conducted is not critical so long as the temperature is at least above that where the vinyl chloride fuses and not above the temperature where the vinyl chloride polymer decomposes. Usually a temperature above about 300° F. or 325° F. and less than about 350° F. or 375° F. is sufficient to obtain an adequately intimate combination of the materials. If desired, suitable minor ingredients can also be included in the ternary polyblends of this invention, including such ingredients as fillers, dyes, pigments, stabilizers, and the like. Preferably, heat stabilizers are added with vinyl chloride polymers as it is placed in the mixing equipment. The ternary polyblend compositions obtained in this invention can be produced in any of the conventional forms. For example, the product can be calendered to form very thin, smooth sheets, press molded, laminated, embossed, cut, drilled, or machined.

The advantages, desirability and the usefulness of the present invention are illustrated by the following example.

EXAMPLE 1

Vinyl chloride polymer binary and ternary blends containing varying proportions of addends were prepared mechanically by milling the various mixtures of ingredients on 3 x 8 inch Thropp mill rolls heated to a temperature of approximately 350° F. A rough mix was first prepared from the powdered vinyl chloride polymer, polysulfide rubber cut up into small pieces, and the pelleted chlorosulfonated ethylene polymer. The required amounts of these ingredients, together with 2% Thermolite 31 stabilizer were admixed by hand in a stainless steel beaker. Thereafter, the rough mix was placed on the heated mill rolls and the components thoroughly homogenized by intensive hot molling for 5 minutes or until an adequate dispersion was obtained. The material was repeatedly cut back during the milling operation in order to make such a complete dispersion of the components was obtained. After blending of the components was complete, as evidenced by visual inspection, the blends were sheeted and stripped from the mill rolls. The sheets were cooled to room temperature and cut into shapes approximating the configurtaion of the mold in which the compression-molded specimens were made. The material was molded between pressed polished plates using a 30 ton Motch and Merryweather press. The samples were first given a three minute preheat at a hydraulic pressure of approximately 50 p.s.i.g. and then heated for a period of 5 minutes with a final temperature of approximately 350° F. and a final hydraulic pressure of 1000 p.s.i.g. At the end of this time, the specimens were cooled to room temperature with water and removed from the press. The desired physical test specimens were then cut from the compression molded material for the determination of various physical properties of the blend.

The physical properties of the various blends are reported in Table I. These physical properties were determined according to the standard ASTM Procedures, more specifically the notched impact strength was determined by the Izod method as set forth in ASTM D–256–47T, the Clash-Berg data were determined according to ASTM D–1043–51, and the tensile strength properties determined according to ASTM D–882–46.

The physical properties reported in Table I were measured on specimens prepared from a commercially available polyvinyl chloride resin identified as "Opalon 300" to which had been added 2% by weight of "Thermolite RS–31" which is a tin mercaptide heat stabilizer. The polysulfide rubber was either "Thiokol ST" or "Thiokol FA" material obtained commercially. The chlorosulfonated polyethylene was obtained commercially and was identified as "Hypalon S2."

Table I
PROPERTIES OF VINYL CHLORIDE POLYMER-POLYSULFIDE RUBBER-CHLOROSULFONATED ETHYLENE POLYMER POLYBLENDS [1]

| Composition, percent | | | Izod Impact Strength, ft.-lb./in. | Clash-Berg Data | | | | Tensile Properties | |
|---|---|---|---|---|---|---|---|---|---|
| Vinyl Chloride Polymer [2] | Polysulfide Rubber [3] | Chlorosulfonated Ethylene Polymer [4] | | $T_f$, °C. | $T_{2000}$, °C. | SFR | Room Temp. Modulus × $10^{-4}$ | Strength at break, p.s.i. | Elongation at break, percent |
| 100 | ------ | --------- | 0.7 | 72.4 | 86.3 | 13.9 | 50 | 8,000 | 160 |
| 85 | 15 | --------- | 0.8 | 51.1 | 82.5 | 31.4 | 25 | 2,700 | 2 |
| 86 | 7 | 7 | 1.68 | 62.1 | 83.1 | 21 | 25 | 4,300 | 52 |

[1] All polyblends contain 2% Thermolite 31 stabilizer.
[2] Opalon 300 vinyl chloride polymer.
[3] Thiokol ST solid polysulfide rubber.
[4] Hypalon S2 chlorosulfonated polyethylene.

It can readily be seen from the data in Table I that the impact strength of vinyl chloride polymer can be increased by mechanically blending a polysulfide rubber and a chlorosulfonated ethylene polymer with the vinyl chloride polymer. Thus, the impact strength of a ternary polyblend composition of this invention of 1.68 ft.-lb./in. is more than twice the impact strength of 0.7 ft.-lb./in. of vinyl chloride polymer. Also, the impact strength of a binary polyblend of vinyl chloride polymer and polysulfide rubber is increased by the addition of chlorosulfonated ethylene polymer to the binary polyblend to form a ternary polyblend of this invention.

It will be observed from the data in Table I that the improvements in impact strength obtained by the addition of chlorosulfonated ethylene polymer to a binary polyblend of vinyl chloride polymer and polysulfide rubber are not at the expense of the rigidity of the binary polyblend composition. That is, the stiffness of the binary composition is not substantially reduced by the presence of the chlorosulfonated ethylene polymer in the composition. The Clash-Berg modulus data and the room temperature modulus data are a measure of the stiffness of a composition as a function of temperature. The brittle temperature ($T_f$) is the temperature at which the stiffness modulus is 135,000 p.s.i., and the rubber temperature ($T_{2000}$) is the temperature at which the stiffness modulus is 2000 p.s.i. The stiff-flex range (SFR) is determined by difference. As shown in Table I, the room temperature modulus of the ternary polyblend compositions of this invention is the same as the room temperature modulus of a binary polyblend composition of vinyl chloride polymer and polysulfide rubber.

The data in Table I also show that the addition of chlorosulfonated ethylene polymer to a binary polyblend composition of vinyl chloride polymer and polysulfide rubber almost doubles the tensile strength of the composition at break; that is, the tensile strength of a binary polyblend composition is 2700 p.s.i. at break whereas the tensile strength of a ternary polyblend composition containing chlorosulfonated ethylene polymer is 4300 p.s.i. at break. In addition, the percent elongation at break of a binary composition of vinyl chloride polymer and polysulfide rubber is greatly increased by the addition of the chlorosulfonated ethylene polymer to the binary composition to form a ternary polyblend composition of this invention. Advantageously, these improvements in tensile properties are obtained with a corresponding increase in the impact strength properties of the compositions.

These improvements in vinyl chloride polymer compositions are believed to be obtained by increasing the compatibility of the polysulfide rubber in the vinyl chloride polymer since polysulfide rubber is only limitedly compatible with vinyl chloride polymer. Although chlorosulfonated ethylene polymer is also only limitedly compatible with vinyl chloride polymer, apparently the mutual compatibility of chlorosulfonated ethylene polymer with polysulfide rubber is such as to increase the compatibility of the polysulfide rubber in the vinyl chloride polymer of the ternary polyblend compositions of this invention, thereby increasing the impact strength of the vinyl chloride polymer.

The ternary polyblend compositions of this invention are useful in making injection molded and compression molded articles, and can also be used in other forms, for example, as films, surface coatings, and monofilaments. They can also be mixed with other materials such as pigments, plasticizers, natural and synthetic resins, fillers, and the like, according to procedures well known to those skilled in the art.

Reasonable variation and modification of the invention as described are possible, the essence of which is that there have been provided ternary polyblend compositions of vinyl chloride polymers comprising a major amount of a vinyl chloride polymer and a minor amount of both a polysulfide rubber and a chlorosulfonated ethylene polymer, and methods for preparing the same.

We claim:

1. A rigid, high impact resistant vinyl chloride resin composition comprising from 40% to 96% by weight of a vinyl chloride polymer, from 2% to 30% by weight of a solid polysulfide rubber, and from 2% to 30% by weight of a chlorosulfonated ethylene polymer.

2. The composition of claim 1 wherein said polysulfide rubber and said chlorosulfonated ethylene polymer are present in equal amounts.

3. The composition of claim 1 wherein said chlorosulfonated ethylene polymer contains a chlorine content of 10% to 50% by weight and a sulfur content of 0.2% to 10% by weight.

4. A rigid, high impact resistant vinyl chloride resin composition comprising vinyl chloride polymer, 7% by weight of solid polysulfide rubber, and 7% by weight of chlorosulfonated ethylene polymer.

5. A method for preparing a ternary blend of a vinyl chloride polymer, a solid polysulfide rubber, and a chlorosulfonated ethylene polymer, said method comprising admixing a major proportion of vinyl chloride polymer with a sufficient proportion of polysulfide rubber to form a limitedly compatible mixture, and further admixing a sufficient proportion of a chlorosulfonated ethylene polymer with said resulting mixture to make said polysulfide rubber and said chlorosulfonate ethylene polymer substantially fully compatible with said vinyl chloride polymer.

6. The method according to claim 10 wherein said ternary polyblend composition is made by admixing said vinyl chloride polymer, said polysulfide rubber, and said chlorosulfonated ethylene polymer simultaneously at an elevated temperature for a period of time sufficient to form a homogeneous blend thereof.

7. The method according to claim 10 wherein said ternary polyblend composition is made by admixing said polysulfide rubber with said chlorosulfonated ethylene polymer and then admixing the resulting admixture with said vinyl chloride polymer at an elevated temperature for a period of time sufficient to form a homogeneous blend thereof.

8. The method according to claim 10 wherein said ternary polyblend composition is made by admixing said vinyl chloride polymer with said polysulfide rubber and then admixing the resulting admixture with said chlorosulfonated ethylene polymer at an elevated temperature for a period of time sufficient to form a homogeneous blend thereof.

9. The method according to claim 10 wherein said ternary polyblend composition is made by admixing said vinyl chloride polymer with said chlorosulfonated ethylene polymer and then admixing the resulting admixture with said polysulfide rubber at an elevated temperature for a period of time sufficient to form a homogeneous blend thereof.

10. A method for preparing a ternary polyblend composition which comprises mechanically admixing from 40% to 96% by weight of a vinyl chloride polymer, from 2% to 30% by weight of a solid polysulfide rubber, and from 2% to 30% by weight of a chlorosulfonated ethylene polymer.

References Cited in the file of this patent

UNITED STATES PATENTS

| | | |
|---|---|---|
| 2,438,949 | Scott et al. | Apr. 6, 1948 |
| 2,466,963 | Patrick et al. | Apr. 12, 1949 |
| 2,956,980 | Law | Oct. 18, 1960 |

OTHER REFERENCES

Renfrew et al.: "Polythene," Iliffe & Sons, Ltd. (London, 1957, 1st edition), pages 275–281.